May 26, 1953 W. M. ZAIKOWSKY 2,639,978
GAS ANALYZER AND METHOD OF USE
Original Filed March 1, 1943
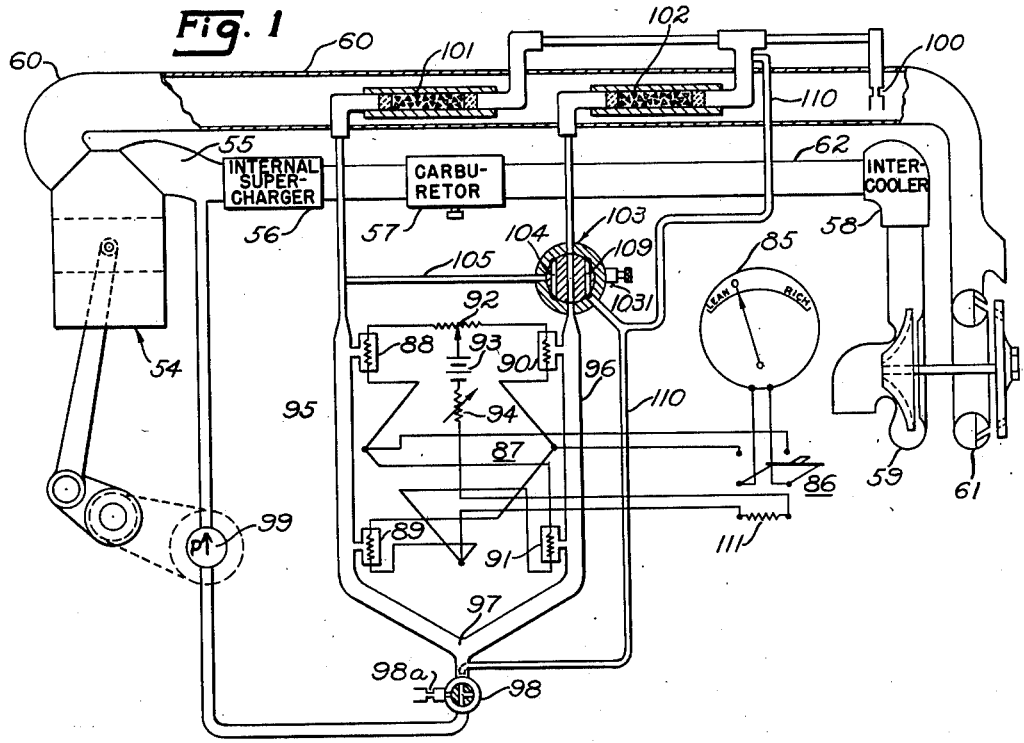
INVENTOR.
WLADIMIR M. ZAIKOWSKY
BY Ellwoodbury
ATTORNEY Patented May 26, 1953

2,639,978

UNITED STATES PATENT OFFICE 2,639,978

GAS ANALYZER AND METHOD OF USE

Wladimir M. Zaikowsky, Pasadena, Calif.,
assignor to Nina D. Zaikowsky

Original application March 1, 1943, Serial No.
477,675. Divided and this application May 27,
1946, Serial No. 672,472

13 Claims. (Cl. 23—232)

This invention relates to gas analysis by the thermal-conductivity method, in which the reduction in temperature of an electrically heated wire caused by contact of the gas therewith is measured or indicated. Such methods, as previously known, are discussed in detail in numerous publications including a book entitled "Gas Analysis by Measurement of Thermal-Conductivity," published in 1933 by H. A. Daynes, to which reference is made.

This is a division of my application, Serial No. 477,675, filed March 1, 1943, now Patent No. 2,591,759.

The analysis of gases by thermal-conductivity measurements has been practiced extensively because it permits continuous testing of a stream of gas, and can be accomplished with apparatus that is relatively simple and rugged. Obviously, these properties are of great importance in, for instance, apparatus for indicating to an airplane pilot whether the combustible mixture supplied to his engine is correct, too lean, or too rich.

An object of this invention is to provide a method and apparatus for testing gaseous products of combustion by thermal conductivity measurements which give a direct indication of the direction of a departure from the theoretical mixture for complete combustion.

Another object is to provide methods and apparatus for making thermal conductivity measurements on exhaust gases that facilitate calibration.

Another object is to produce, by thermal conductivity measurements, accurate indications of both lean and rich mixtures over a wide range.

Another object is to provide thermal conductivity exhaust gas testing apparatus that is readily calibrated to give direct indications of rich and lean mixtures for all fuels.

A feature of the invention is the separate treatment and comparison of the thermal conductivities, preferably at low pressures, of two streams of the gas being tested, instead of comparing the thermal conductivity of the gas being tested with that of an extraneous gas, such as air or water vapor. For example, I have found that by dividing a stream of exhaust gas to be analyzed into two streams, treating one stream with a suitable solid oxidizing agent, treating the other stream with a suitable solid reducing agent, and then comparing the thermal-conductivities of the two streams, important advantages are obtained. One advantage is that when the mixture of fuel and air is perfect for complete combustion, the thermal-conductivities of the two streams are the same, because normally there is nothing in the exhaust gas to be either oxidized or reduced; hence, the neutral or zero position of the meter that indicates differences in thermal-conductivities of the two streams, corresponds to the position for a perfect mixture independently of the particular formula of the fuel. This greatly simplifies calibration of the instrument.

Another important advantage is that the relative thermal-conductivities of the two treated streams of gas vary relatively uniformly over the entire useful range, and vary in opposite directions, for rich and lean mixtures respectively, independently of the particular formula of the fuel; thereby making it possible to accurately calibrate the instrument for direct reading with all fuels.

Other specific features will become apparent from the detailed description to follow which refers to the drawing.

In the drawing:

Fig. 1 is a schematic diagram of a system in which the invention is applied to the analysis of the exhaust gas of an internal combustion engine;

Fig. 2 is a detail view of a valve employed in the system of Fig. 1, showing the valve in a different position;

Fig. 3 is a graph illustrating the performance characteristic of the system of Fig. 1;

Fig. 4 is a schematic diagram showing a modification of the system of Fig. 1.

One of the numerous methods of employing the invention for exhaust gas analysis is illustrated in Fig. 1 in which an internal combustion engine 54 has an intake manifold 55 connected through an internal supercharger 56, a carburetor 57, an inter-cooler 58, and an external supercharger 59 to the atmosphere, and has an exhaust manifold 60 connected to a supercharger turbine 61 which drives the external supercharger 59. The general arrangement described is common on aeroplanes.

The testing apparatus comprises as its essential elements a specially designed and calibrated meter 85 adapted to be connected by a double pole, double throw switch 86 to a bridge 87 having four test cells 88, 89, 90 and 91, respectively, connected in the four arms thereof. The usual balancing potentiometer 92, battery 93, and current adjusting resistor 94 are provided.

The two test cells 88 and 89 are connected in diagonally opposite arms of the bridge but are associated with a common passage 95. The other two test cells 90 and 91 are positioned in the other two arms of the bridge and are associated with a common passage 96. The output ends of these two passages 95 and 96 are connected together at a junction 97 and through a valve 98 to an exhaust pump 99, which may be driven from the engine 54.

The valve 98 normally connects the junction 97 to the pump 99, but, when turned counter-clockwise 90°, admits atmospheric air through a constriction 98$a$ to the junction 97 for a purpose to be later described.

The two passages 95 and 96, respectively, are supplied with exhaust gas from the exhaust manifold 60 preferably through a common constriction 100, but through two separate treating tubes 101 and 102, respectively. It may be assumed that the treating tube 101 contains carbon and that the treating tube 102 contains copper oxide. Both treating tubes are shown positioned within the exhaust manifold 60 so that they will be heated to suitable reacting temperatures by the exhaust gases, but the heating could be done in a separate furnace. The outlet of the treating tube 101 is permanently connected to the passage 95 but a valve 103 is provided between the treating tube 102 and the passage 96. In its normal position, this valve functions only to admit gas from the tube 102 to the passage 96. When the valve 103 is turned counter-clockwise through an angle of 45° as shown in Fig. 2, a passage 104 in the valve connects the passage 96 through a conduit 105 with the passage 95 so that gas passing through the treating tube 101 is admitted to both the passages 95 and 96; and a passage 109 in the valve admits air through a needle valve 103$l$ into the outlet end of the treating tube 102.

The single meter 85 is employed both to indicate the condition of balance of the bridge and the current flowing through the bridge. When the switch 86 is thrown into its upper position, the meter is connected across the bridge. When the switch is thrown to its lower position, the meter is connected in shunt to a resistor 111 permanently connected in series with the variable resistor 94 and the battery 93. The resistor 111 is provided to decrease the sensitivity of the meter 85 when it is connected to show the current flowing through the bridge, because the total current delivered to the bridge is enormously great as compared to the current that flows through the meter in response to unbalance of the bridge when the switch 86 is in its upper position.

The apparatus of Fig. 1 is operated as follows: First the switch 86 is thrown into lower position and the total current flowing in the bridge is adjusted by resistor 94 until the meter 85 indicates a predetermined value for which the system has been calibrated. The switch 86 is then restored to its upper position. Then the valve 103 is swung counter-clockwise to admit the same gas from the treating tube 101 through both test channels 95 and 96, and the bridge is balanced by adjusting the potentiometer 92 until the meter shows zero current. This particular meter is in neutral position, both mechanically and electrically, and indicates zero current, when the hand is at "0." Finally, the valve 103 is restored to its normal position, as shown in Fig. 1. Thereafter, exhaust gas treated with hot carbon in the tube 101 passes through the passage 95, and exhaust gas treated by the hot copper oxide in tube 102 passes through passage 96. These two differently treated gases will have the same thermal-conductivity if the mixture is theoretically correct, but will vary from equality in one direction if the mixture becomes too rich and in the other direction if it becomes too lean, so that the meter 85 will automatically give a direct indication of the quality of the mixture.

The reason for this will be explained with reference to Fig. 3, in which a solid curve 112—112$c$ and a dash curve 113—113$c$ show the variations in thermal-conductivities of the untreated exhausts of two fuel-air mixtures, in which the fuel is octane and benzol, respectively. These curves show that a meter calibrated to indicate a minimum thermal-conductivity with one fuel might be grossly inaccurate with a different fuel if precautions are not taken in accordance with the principles of the present invention as explained below.

Considering now the effect on the thermal-conductivity of the exhaust of treating it with heated copper oxide, the left part 112 or 113 of the curve remains unchanged because there is nothing to oxidize in a lean mixture. On the other hand, the right part 112$c$ or 113$c$ is drastically altered, because the unburned fuel gases in the exhaust of a rich mixture have a higher thermal-conductivity than do their products of combustion. Actually, the right (rich) portions of the thermal-conductivity curves for exhaust gas treated with copper oxide (the gas in passage 96 of Fig. 1) are substantially straight extensions of the left portions, as indicated at 112$a$ and 113$a$ in Fig. 3. Thus curve 112—112$a$ represents the variation of the thermal-conductivity of the gas supplied to passage 96 when the exhaust gas from octane is treated in tube 102. Also curve 113—113$a$ represents the variation of the thermal-conductivity of the gas supplied to passage 96 when the exhaust gas from benzol is treated in tube 102.

In the preparation of the curves of Fig. 3 it has been assumed that in continuous operation, the copper oxide tube may contain enough reduced copper to absorb the oxygen in the lean mixture.

Considering next the effect on the thermal-conductivity of the exhaust of treating it with hot carbon, the right part 112$c$ or 113$c$ of the curve remains unchanged because there is no oxygen to combine with the carbon in a rich mixture. The left part 112 or 113 of the curve is altered, because the excess oxygen in a lean mixture has a higher thermal-conductivity than do the products of combustion of the carbon. Hence, the exhaust of a lean mixture, which normally has a thermal-conductivity indicated by the curve 112 or 113, will have a thermal-conductivity indicated by the curve 112$b$ or 113$b$ after treatment with hot carbon. Thus curve 112$b$—112$c$ represents the variation of the thermal-conductivity of the gas supplied to passage 95 when the exhaust gas from octane is treated in tube 101. Also curve 113$b$—113$c$ represents the variation of the thermal-conductivity of the gas supplied to passage 95 when the exhaust gas from benzol is treated in tube 101.

It is to be understood that under certain conditions of engine operation, oxides of nitrogen may be present in the exhaust, as well as oxygen, and they are capable of reaction with heated carbon. It may be desirable when the amount of nitrogen oxides is appreciable, to decompose or absorb them in a separate treating tube, but it is not ordinarily necessary.

It will be apparent that in the system of Fig. 1, one sample of treated exhaust having the thermal-conductivity characteristics shown by the curve 112—112a or 113—113a is compared with a second sample of treated exhaust having the thermal-conductivity characteristic shown by the curve 112b—112c or 113b—113c. It will be observed that the two samples compared have the same thermal-conductivity at the theoretical ratio irrespective of the fuel employed, since they intersect at that point.

In Fig. 3 the upper curves represent variations in thermal-conductivity that would be obtained if the exhaust samples identified therewith were compared against a fixed reference gas, such as air, but they do not necessarily represent the exact galvanometer readings, and their vertical position in the graph with respect to the vertical position of the lower curves 114 and 115 has no significance. Irrespective of this, when the two samples treated with hot carbon and with copper oxide, respectively, are compared with each other in the system of Fig. 1, the actual galvanometer readings correspond to the differentials of the upper curves, and the resultant differential curve 114 represents the galvanometer readings actually obtained for different fuel-air ratios when benzol is the fuel, and the curve 115 represents actual galvanometer readings obtained for different fuel-air ratios when the fuel is octane. These curves 114 and 115 have several interesting characteristics:

(1) They both pass through zero at the theoretically perfect mixture. Hence, if the system is calibrated to show zero reading on meter 85 in Fig. 1, for theoretically perfect ratio of one fuel, it is calibrated to show zero reading with the theoretical ratio of any fuel. Furthermore, the bridge 87 can be balanced for zero current at theoretically perfect mixture, so that the normal position of rest of the meter hand is at zero, and variations in the current in the bridge, produced by varying the resistor 94 for the purpose of varying the sensitivity, can be made without shifting the hand away from zero position. In actual practice, the balance of the bridge can be quickly tested at any time by simply throwing the valve 103 into the position shown in Fig. 2 to admit the same gas from the treating tube 101 into both of the passages 95 and 96.

(2) The curves 114 and 115 vary in opposite directions for lean and rich mixtures, respectively, so that the meter hand moves in one direction away from the zero point to indicate lean mixtures, and in the opposite direction away from the zero point to indicate rich mixtures. This eliminates all the disadvantages of attempting to determine the minimum thermal-conductivity of the gas.

(3) The two curves 114 and 115 differ from each other only slightly at any part of their range and differ scarcely at all closely adjacent the zero point. This makes it possible to adjust the bridge to the same sensitivity for all fuels and eliminates the necessity of separately calibrating it for each particular fuel that may be employed.

(4) The slopes of the curves for lean mixtures, although less than the slopes for rich mixtures, are appreciably greater than the slopes of the curves 112, 112b, 113, and 113b, thereby giving superior sensitivity in the lean range, as compared with that obtainable in prior known arrangements.

It has previously been indicated that the operator can check the balance of the bridge in the system of Fig. 1 at any time by throwing the valve 103 into the position shown in Fig. 2 to admit the same gas from the treating tube 101 into both of the passages 95 and 96. This valve is so arranged as to perform another useful function. Thus, air is by-passed through the needle valve 103¹ and the valve passage 109 through the copper oxide tube 102 in reverse direction, then through the conduit 110, to the exhaust pump 99. This circulation of atmospheric air over the hot copper oxide in the tube 102 regenerates it by reoxidizing reduced copper back to copper oxide. Air enters the passage 109 through the valve 103¹ as shown, to limit the pressure and prevent air from also flowing through the tube 101 and consuming the carbon. Such flow of air from tube 102 to tube 101 can also be prevented by providing separate constrictions for tubes 101 and 102 instead of supplying them both from the single constriction 100.

The suction pump 99 is preferably of such capacity relative to the constriction 100 as to maintain a low pressure in the gas passage and cells.

One great advantage of low pressure operation in the system of Fig. 1 is the reduction of the lag between a change in composition of the mixture and an indication thereof by the instrument; but another very important advantage of the low pressure operation is the reduction in the rate of consumption of the carbon and the copper oxide in the treating tubes 101 and 102. As a matter of fact, the reduction in the pressure sometimes makes it feasible to employ a system utilizing these reagents where it would be utterly impracticable in operation at normal atmospheric pressures.

I find that it is sufficient and even preferable to heat copper oxide to a relatively low temperature from 300° (C.) to 400° (C.) at which only complete combustion of hydrogen and carbon monoxide is assured, while methane remains unaffected. As is known, for complete combustion of methane copper oxide should be heated to a temperature of 700° (C.) or more. However, the method can be practiced with very wide range of temperatures.

As long as the pump 99 is running, the exhaust gases in the system remain expanded, and the dew point of the gases is sufficiently low to prevent any condensation of water within the system. However, when the pump is stopped—if exhaust gas continued to flow through the restriction 100 until the system was filled at atmospheric pressure—the water vapor pressure might rise above the dew point, with resultant precipitation. It is important to prevent such condensation, since the water might remain for an indefinite period of time in the cells and cause damage to the insulation by corrosion. There are ways of preventing such condensation, one of which is to drive the suction pump 99 from the engine, the exhaust of which is being analyzed, so that the pump continues to operate as long as the fuel flow to the engine is continued. When the engine is stopped, either by cutting the ignition or shutting off the fuel flow, the engine normally will continue to rotate by its momentum long enough to scavenge from the exhaust manifold exhaust products high in water content, so that, by the time the engine and pump stop, the exhaust manifold 60 will be filled with air or air-fuel mixture containing only atmospheric humidity. Therefore, in the last period of operation relatively dry air will flow through the passages 95 and 96, while the pressure in those passages and in the cells is rising to atmospheric pressure, and condensation of water in the cells and passages will be effectively prevented.

In those instances in which the suction pump 99 is not directly coupled to the engine 54, the valve 98 may be employed to prevent condensation of liquids in the apparatus by rotating this valve counter-clockwise 90° shortly before or simultaneously with the shut-down of the pump 99. This admits atmospheric air through the constriction 98a to the junction 97, and thence back up into the passages 95 and 96, filling those passages and the cells associated therewith with atmospheric air at atmospheric pressure. The constriction 98a prevents a too rapid inrush of air into the cells. It is possible for the filaments in the cells to be damaged by sudden admission of gas thereto at full atmospheric pressure.

The constriction 100 serves as very effective means for preventing damage to the filaments (resistors) in the test cells from explosions in the exhaust manifold, which occasionally happen. Elimination of this danger makes it possible to use larger diffusion passages in the cells than would otherwise be safe.

Thermal-conductivity cells of the general type employed in the system so far described are well known, and many of the cells already in use can be adapted for operation in my system. However, I have developed a construction of cell that has special advantages, and which is disclosed in my corresponding application, Ser. No. 582,467, filed March 13, 1945 to which reference is made.

It is apparent from Fig. 3 that a given departure from theoretical ratio on the rich side produces a much greater change in thermal-conductivity than the same departure on the lean side. It is desirable, therefore, to use a meter having an asymmetric scale in which the "lean" range is shorter than the "rich" range, as shown in Fig. 1.

It is possible to obtain deflection of an indicating meter to one side of a "0" or neutral point to indicate lean mixtures and to the other side to indicate rich mixtures by comparing treated exhaust gas against air, and a system utilizing this mode of operation is illustrated in the schematic diagram of Fig. 4, which shows a portion of the exhaust and intake system of Fig. 1 in combination with a single bridge 75 having a reference cell 76 exposed to air from the intake pipe 62 and a test cell 77 which may be supplied through a valve 78 either with untreated or treated exhaust gas from the exhaust manifold 60. When the valve is in the position shown, untreated exhaust gas, after being expanded by passage through the constriction 79, is conveyed directly past the test cell 77 and thence to the exhaust pump 80. However, if the valve 78 is rotated 90° clockwise, then gas can no longer pass directly from the constriction 79 to the test cell but must flow through a tube 81, positioned within the exhaust manifold 60 for heating purposes and thence through the valve 78 to the test cell 77.

The apparatus of Fig. 4 is operated as follows: First, with the current adjusted to the value for which the meter scale is calibrated, the valve 78 is positioned as shown in the drawing so that untreated exhaust gas is delivered to the cell 77, and the carburetor 57 is adjusted until the meter 65 indicates minimum thermal-conductivity. Then the bridge is adjusted by manipulation of the potentiometer 82 to bring the hand of the meter to the "0" point on the scale, indicating theoretical mixture. Thereafter, the valve 78 is rotated 90° clockwise, causing exhaust gas to pass through the treating tube 81 and thence to the cell 77. The treating tube 81 may contain an oxidizing agent such as copper oxide, or it may contain a reducing agent, such as solid carbon. If an oxidizing agent is employed, then all unburned fuel in the exhaust is oxidized and the thermal-conductivity of the gas reaching the cell 77, instead of having the characteristic shown by curves 112 and 112c in Fig. 3, gradually and continuously decreases in thermal-conductivity as the mixture becomes richer, as shown by curves 112 and 112a. On the other hand, if the tube 81 contains a reducing agent such as carbon, then all excess oxygen in the exhaust is burned to carbon dioxide and the resultant gas reaching the cell 77 will have a continuously lower thermal-conductivity as the mixture varies from rich to lean, as shown by curves 112c and 112b. In either event, the scale of the meter 65 can be calibrated so that the hand will indicate directly whether the mixture is theoretically correct, too lean, or too rich.

To properly explain the invention, several embodiments thereof have been described in detail, but it is to be understood that the invention is not limited to the particular embodiments shown, but only to the extent set forth in the appended claims.

I claim:

1. In a method of determining the ratio of a fuel and air mixture being supplied to a combustion device, the steps which comprise: forming a first stream of exhaust gas exhausted from said device; treating said first stream of exhaust gas with an oxidizing agent which will alter the thermal-conductivity of such exhaust gas only if said mixture is rich, the thermal-conductivity of said first stream thereby decreasing with the fuel-air ratio; forming a second stream of exhaust gas exhausted from said device; treating said second stream of exhaust gas with a reducing agent to alter the thermal-conductivity of such exhaust gas only if said mixture is lean, the thermal-conductivity of said second stream thereby increasing with the fuel-air ratio; and comparing the thermal-conductivities of said two treated streams; whereby theoretical ratio is indicated by equal thermal-conductivities of the streams, a lean mixture is indicated by a departure from equality in one direction, and a rich mixture is indicated by a departure from equality in the other direction, independently of variations in the absolute thermal-conductivities of the exhaust gas resulting from different fuels.

2. In a method of determining the ratio of a fuel and air mixture being supplied to a combustion device, the steps which comprise: forming a first stream of exhaust gas exhausted from said device; treating said first stream of exhaust gas with hot copper oxide to alter the thermal-conductivity of such exhaust gas only if said mixture is rich, the thermal-conductivity of said first stream thereby decreasing with the fuel-air ratio; forming a second stream of exhaust gas exhausted from said device; treating said second stream of exhaust gas with hot carbon to alter the thermal-conductivity of such exhaust gas only if said mixture is lean, the thermal conductivity of said second stream thereby increasing with the fuel-air ratio; and comparing the thermal-conductivities of said two treated streams; whereby theoretical ratio is indicated by equal thermal-conductivities of the streams, a lean mixture is indicated by a departure from equality in one direction, and a rich mixture is indicated by a departure from equality in the other direction, independently of variations in the absolute thermal-conductivities of the exhaust gas resulting from different fuels.

3. Thermal-conductivity exhaust gas analyzing apparatus comprising: a pair of test cells, a metering system for indicating the magnitude and direction of departure from equality of the thermal-conductivities of the gases in said two cells, separate conduits for delivering two streams of the exhaust gas to be tested to said respective cells, one of said conduits including a charge of a solid oxidizing agent adapted to oxidize unburned fuel components in the stream being delivered to one of said cells, and the other conduit including a charge of a solid reducing agent adapted to combine with free oxygen in the stream being delivered to the other said cell, whereby theoretical ratio is indicated by equal thermal-conductivities of the streams, a lean mixture is indicated by a departure from equality in one direction, and a rich mixture is indicated by a departure from equality in the other direction, independent of variations in the absolute thermal-conductivities of the exhaust gas resulting from different fuels.

4. Thermal-conductivity exhaust gas analyzing apparatus comprising: a pair of test cells, a metering system for indicating the magnitude and direction of departure from equality of the thermal-conductivities of the gases in said two cells, separate conduits for delivering two streams of the exhaust gas to be tested to said respective cells, one of said conduits including a charge of copper oxide adapted to oxidize unburned fuel components in the stream being delivered to one of said cells, and the other conduit including a charge of carbon adapted to combine with free oxygen in the stream being delivered to the other said cell, whereby theoretical ratio is indicated by equal thermal-conductivities of the streams, a lean mixture is indicated by a departure from equality in one direction, and a rich mixture is indicated by a departure from equality in the other direction, independent of variations in the absolute thermal-conductivities of the exhaust gas resulting from different fuels.

5. The method of analyzing exhaust gas resulting from combustion of a fuel containing carbon with air which comprises: producing two streams of said exhaust gas; treating one of said streams with a solid oxidizing agent so as to complete oxidation of substantially all carbon in said one stream to carbon dioxide; treating the other stream of said exhaust gas with a solid reducing agent so as to consume substantially all free oxygen in said other stream; and measuring the difference in the thermal-conductivity of treated portions of said two streams.

6. The method of analyzing exhaust gas resulting from combustion of a fuel containing carbon with air which comprises: producing two streams of said exhaust gas; treating one of said streams with hot copper oxide so as to complete oxidation of substantially all carbon in said one stream to carbon dioxide; treating the other stream of said exhaust gas with hot carbon so as to consume substantially all free oxygen in said other stream; and measuring the difference in the thermal-conductivity of treated portions of said two streams.

7. Apparatus for analyzing the gas flowing in an exhaust conduit connected to a device in which the combustion of air and a hydrocarbon fuel occurs and which produces hot exhaust gases comprising, a main exhaust conduit connected to said device for leading off hot exhaust gases therefrom, a pair of test cells, separate branch conduits for flowing streams of exhaust gas from said main exhaust conduit to said respective cells, portions of the respective branch conduits being located in heat exchange relationship with heated exhaust gas flowing in said main exhaust conduit, a charge of a solid oxidizing agent adapted to oxidize unburned fuel components located in the heated portion of one of said branch conduits, a charge of a solid reducing agent adapted to combine with free oxygen located in the heated portion of the other branch conduit, means for comparing the thermal-conductivities of gases in said two cells whereby the theoretical fuel-air ratio is indicated by equal thermal-conductivities of treated gas flowing to the respective cells, a lean mixture is indicated by a departure from equality in one direction, and a rich mixture is indicated by a departure from equality in the other direction, independent of variations in the absolute thermal-conductivities of the exhaust gas when different fuels are used.

8. Apparatus for analyzing the gas flowing in an exhaust conduit connected to a device in which the combustion of air and a hydrocarbon fuel occurs and which produces hot exhaust gases comprising, a main exhaust conduit connected to said device for leading off hot exhaust gases therefrom, a pair of test cells, separate branch conduits for flowing streams of exhaust gas from said main exhaust conduit to said respective cells, portions of the respective branch conduits being located in heat exchange relationship with heated exhaust gas flowing in said main exhaust conduit, a charge of copper oxide adapted to oxidize unburned fuel components located in the heated portion of one of said branch conduits, a charge of a carbon adapted to combine with free oxygen located in the heated portion of other branch conduit, means for comparing the thermal-conductivities of gases in said two cells whereby the theoretical fuel-air ratio is indicated by equal thermal-conductivities of treated gas flowing to the respective cells, a lean mixture is indicated by a departure from equality in one direction, and a rich mixture is indicated by a departure from equality in the other direction, independent of variations in the absolute thermal-conductivities of the exhaust gas when different fuels are used.

9. In the analysis by thermal-conductivity methods of the exhaust gas resulting from the combustion of air and a hydrocarbon fuel, which exhaust gas has a minimum thermal-conductivity for the theoretically correct fuel-air ratio, the steps which comprise treating the exhaust gas with a solid reducing agent to convert any free oxygen therein to carbon dioxide whereby the treated exhaust gas possesses a thermal-conductivity which increases as the fuel-air ratio increases through a range including both lean and rich mixtures, and measuring the difference between the thermal-conductivity of the treated exhaust gas and the thermal-conductivity of a reference gas sample.

10. In the analysis of thermal-conductivity methods of the exhaust gas resulting from the combustion of air and a hydrocarbon fuel, which exhaust gas has a minimum thermal-conductivity for the theoretically correct fuel-air ratio, the steps which comprise treating the exhaust gas with carbon to convert any free oxygen therein to carbon dioxide whereby the treated exhaust gas possesses a thermal-conductivity which increases as the fuel-air ratio increases through a range including both lean and rich mixtures, and measuring the difference between the thermal-conductivity of the treated exhaust gas and the thermal-conductivity of an auxiliary gas sample.

11. Apparatus for analyzing the exhaust gas resulting from the combustion of air and a hydrocarbon fuel in a combustion device, which exhaust gas has a minimum thermal-conductivity for the theoretically correct fuel-air ratio, a test cell, a conduit for delivering a stream of the exhaust gas to be tested to said cell, means including a charge of a solid reducing agent located in said conduit to convert any free oxygen in the exhaust gas being supplied to said test cell into carbon dioxide whereby the treated exhaust gas possesses a thermal-conductivity which increases as the fuel-air ratio increases through a range including both lean and rich mixtures, and means connected to said test cell for indicating changes in the thermal-conductivity of treated exhaust gas delivered thereto over said range of lean and rich mixtures.

12. Apparatus for analyzing the exhaust gas resulting from the combustion of air and a hydrocarbon fuel in a combustion device, which exhaust gas has a minimum thermal-conductivity for the theoretically correct fuel-air ratio, a test cell, a conduit for delivering a stream of the exhaust gas to be tested to said cell, means including a charge of carbon located in said conduit to convert any free oxygen in the exhaust gas being supplied to said test cell into carbon dioxide whereby the treated exhaust gas possesses a thermal-conductivity which increases as the fuel-air ratio increases through a range including both lean and rich mixtures, and means connected to said test cell for indicating changes in the thermal-conductivity of treated exhaust gas delivered thereto over said range of lean and rich mixtures.

13. Thermal-conductivity gas analyzing apparatus comprising: a pair of test cells; a metering system controlled by said test cells to indicate differences in thermal-conductivity of the gases in said two cells; separate conduits for delivering two separate streams of gas to said respective cells, one of said conduits including a charge of a solid oxidizing agent for normally oxidizing oxidizable components in the gas stream flowing therethrough to the associated cell, said oxidizing agent being restorable to oxidizing condition by treatment with oxygen; and means including a valve structure operable to admit gas from the other conduit to both cells to calibrate said metering system and to simultaneously flow oxygen to said oxidizing agent to restore it.

WLADIMIR M. ZAIKOWSKY.

References Cited in the file of this patent

UNITED STATES PATENTS

| Number | Name | Date |
|---|---|---|
| 1,530,202 | Rodhe | Mar. 17, 1925 |
| 2,298,288 | Gerrish | Oct. 13, 1942 |

OTHER REFERENCES

Palmer and Weaver, "Thermal-Conductivity Method for the Analysis of Gases," Technologic Papers of the Bureau of Standards, No. 249, part of vol. 18, Jan. 7, 1924, page 49.